United States Patent
Kojima et al.

(10) Patent No.: US 11,587,383 B2
(45) Date of Patent: Feb. 21, 2023

(54) APPARATUS, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/343,792

(22) Filed: Jun. 10, 2021

(65) Prior Publication Data
US 2021/0407239 A1    Dec. 30, 2021

(30) Foreign Application Priority Data

Jun. 25, 2020 (JP) .............................. JP2020-110034

(51) Int. Cl.
*G07C 9/28* (2020.01)
*G07C 9/29* (2020.01)
*G07C 9/00* (2020.01)

(52) U.S. Cl.
CPC ........... *G07C 9/28* (2020.01); *G07C 9/00309* (2013.01); *G07C 9/29* (2020.01)

(58) Field of Classification Search
CPC ........ G07C 9/28; G07C 9/00309; G07C 9/29; G07C 9/00; G07C 9/00174; G07C 2209/62; H04N 7/186; G08B 13/19695
USPC ....................................................... 340/5.61
See application file for complete search history.

(56) References Cited

U.S. PATENT DOCUMENTS

| | | | |
|---|---|---|---|
| 8,670,752 B2* | 3/2014 | Fan ......................... | H04W 4/02 725/62 |
| 9,443,365 B2* | 9/2016 | Ahearn .................... | G07C 9/28 |
| 10,515,276 B2* | 12/2019 | Sakashita ............... | G06V 20/53 |
| 10,721,444 B2* | 7/2020 | Rabinowitz ........ | G07C 9/00174 |
| 10,880,526 B2* | 12/2020 | Fitzgibbon ....... | G08B 13/19684 |
| 2016/0093180 A1 | 3/2016 | Fitzgibbon | |
| 2016/0307380 A1* | 10/2016 | Ho ..................... | G07C 9/00309 |
| 2017/0070657 A1* | 3/2017 | Yokomizo .............. | H04N 5/907 |

(Continued)

FOREIGN PATENT DOCUMENTS

| | | |
|---|---|---|
| JP | 2011018298 A | 1/2011 |
| JP | 2015162232 A | 9/2015 |

(Continued)

OTHER PUBLICATIONS

Extended European Search Report for counterpart European Application No. 21180748.2, issued by the European Patent Office dated Nov. 18, 2021.

(Continued)

*Primary Examiner* — Nam V Nguyen

(57) ABSTRACT

Provided is an apparatus comprising: a detection unit configured to detect a state of an electric lock provided at a doorway; a first monitoring camera arranged on the inside of the doorway; a judging unit configured to judge, at a reference time of day, whether the electric lock is locked; and a sending unit configured to send image data captured by the first monitoring camera or location information of the image data to a destination corresponding to the electric lock, when the electric lock is not locked at the reference time of day.

13 Claims, 4 Drawing Sheets

(56) References Cited

U.S. PATENT DOCUMENTS

2019/0281261 A1   9/2019   Rabinowitz
2020/0059774 A1*  2/2020   Padgett .................. H04W 4/38

FOREIGN PATENT DOCUMENTS

WO   2017136160 A1   8/2017
WO   2017209030 A1   12/2017

OTHER PUBLICATIONS

Office Action issued for counterpart Japanese Application No. 2020-110034, issued by the Japan Patent Office dated May 17, 2022 (drafted on May 10, 2022).
Office Action issued for counterpart Indian Application No. 202114025125, issued by the India Intellectual Property Office dated Mar. 28, 2022.

* cited by examiner

180# APPARATUS, METHOD AND STORAGE MEDIUM

The contents of the following Japanese patent application(s) are incorporated herein by reference:
2020-110034 filed in JP on Jun. 25, 2020

BACKGROUND

1. Technical Field

The present invention relates to an apparatus, a method, and a recording medium.

2. Related Art

Conventionally, a variety of security systems using a monitoring camera has been proposed (for example, see Patent document 1).
[Patent Document 1] Japanese Patent Application Publication No. 2015-162232

SUMMARY

A first aspect of the present invention provides an apparatus. The apparatus may include a detection unit configured to detect a state of an electric lock provided at a doorway. The apparatus may include a first monitoring camera arranged on the inside of the doorway. The apparatus may include a judging unit configured to judge, at a reference time of day, whether the electric lock is locked. The apparatus may include a sending unit configured to send image data captured by the first monitoring camera or location information of the image data to a destination corresponding to the electric lock, when the electric lock is not locked at the reference time of day.

A second aspect of the present invention provides a method. The method may include detecting a state of an electric lock provided at a doorway. The method may include judging, at a reference time of day, whether the electric lock is locked. The method may include sending image data captured by the first monitoring camera arranged on the inside of the doorway or location information of the image data to a destination corresponding to the electric lock, when the electric lock is not locked at the reference time of day.

A third aspect of the present invention provides a recording medium having recorded thereon a program. The program may cause a computer to function as a detection unit configured to detect a state of an electric lock provided at a doorway. The program may cause the computer to function as a first monitoring camera arranged on the inside of the doorway. The program may cause the computer to function as a judging unit configured to judge, at a reference time of day, whether the electric lock is locked. The program may cause the computer to function as a sending unit configured to send image data captured by the first monitoring camera or location information of the image data to a destination corresponding to the electric lock, when the electric lock is not locked at the reference time of day.

Note that the summary clause does not necessarily describe all necessary features of the embodiments of the present invention. In addition, the present invention may also be a sub-combination of the features described above.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments necessarily are essential to solving means of the invention.

1. First Embodiment

1.1. Security System 1

Figure 1:
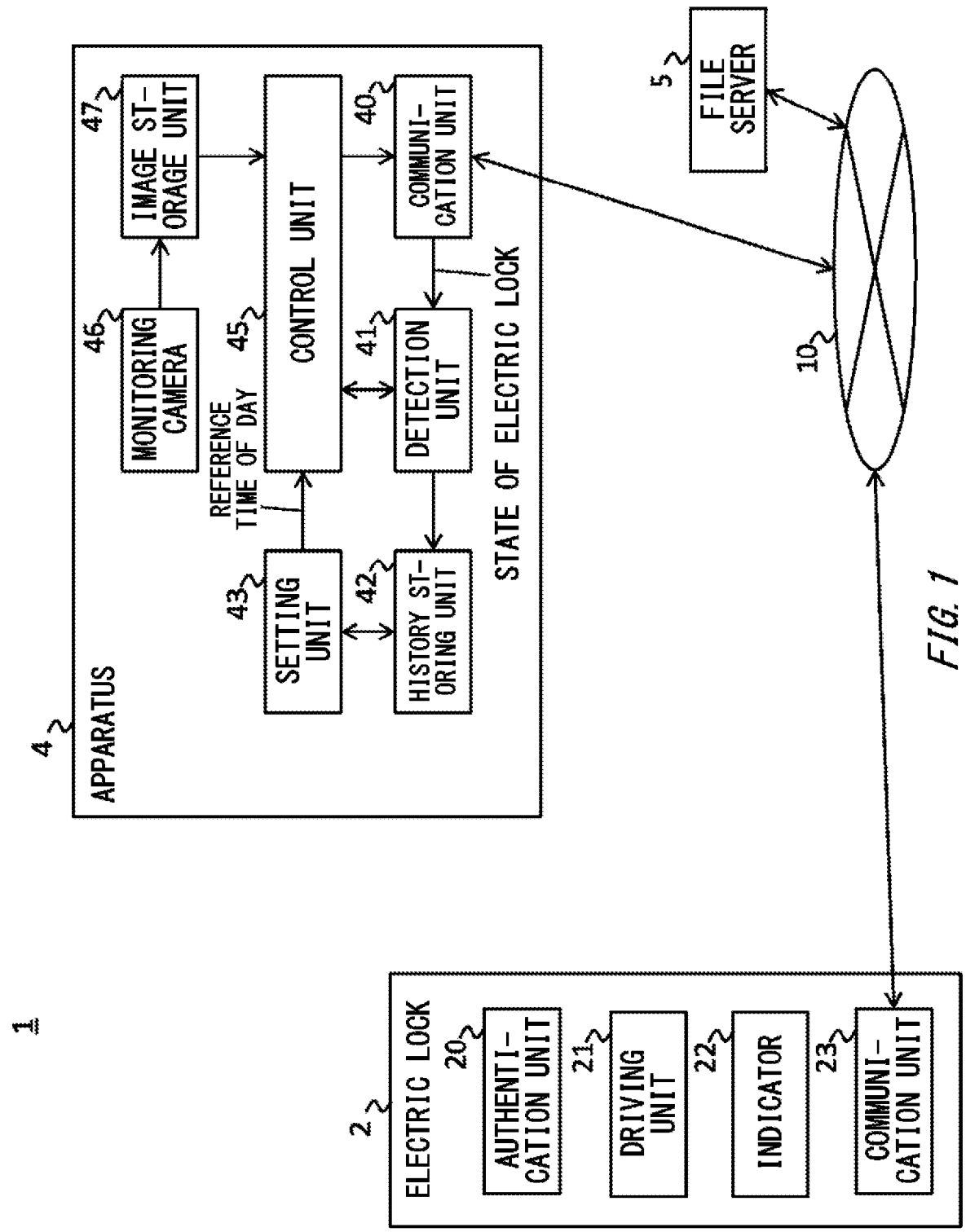
FIG. 1 shows a security system 1 according to a first embodiment.

FIG. 1 shows a security system 1 according to a first embodiment. The security system 1 includes an electric lock 2, an apparatus 4, and a file server 5.

Herein, the electric lock 2, the apparatus 4, and the file server 5 may be connected with each other via a communication network 10. In FIG. 1, the electric lock 2, the apparatus 4, and the file server 5 are connected via a single communication network 10. However, the electric lock 2, the apparatus 4, and the file server 5 may be connected with each other via separate communication networks.

The communication network 10 may be composed by including various networks such as the Internet, Wide Area Network (WAN), and Local Area Network, or the combination thereof. The communication network 10 may include a connection point which uses at least one of wired communication or wireless communication. The communication network 10 may be implemented by a dedicated line separated from a public line such as the Internet.

[1.1.1. Electric Lock 2]

The electric lock 2 is provided at a doorway of a facility or the like.

The facility may be a plant, or may be a school, a house, a station, a museum, a hospital, a store (as one example, a restaurant) or the like. Examples of the plant include, besides an industrial plant such as a chemical plant or a biological plant, a plant for managing and controlling a wellhead or its surrounding area of a gas field, an oil field or the like, a plant for managing and controlling power generation such as hydraulic power generation, thermal power generation and nuclear power generation, a plant for managing and controlling energy harvesting such as solar photovoltaic generation, wind power generation or the like, and a plant for managing and controlling water and sewerage, a dam or the like. The doorway of the facility may be a doorway provided at a boundary between the inside and the outside of the facility, or may be a doorway provided at a boundary between one region and another region in the facility.

The electric lock 2 may be configured to lock and unlock the doorway or may be a lock body incorporating a mechanism configured to electrically lock and unlock. The electric lock 2 may allow at least one of locking operation or unlocking operation, on at least one of the inside or the outside of the doorway. The electric lock 2 has an authentication unit 20, a driving unit 21, an indicator 22, and a communication unit 23.

[1.1.1-1. Authentication Unit 20]

The authentication unit 20 is configured to perform authentication of a person who performs locking and unlocking of an electric lock 2.

The authentication unit 20 may perform authentication by using authentication information provided in the interior or on the surface of the key that is used by a person who performs locking and unlocking or may perform authentication by using biological information of a person who performs locking and unlocking (as one example, fingerprint authentication, iris authentication, or vein authentication), or may perform authentication by using a password inputted via an input device not shown (as one example, a personal identification number). The authentication unit 20 may supply the driving unit 21 with an authentication result.

Note that, when the electric lock 2 is locked and unlocked by a key, the key may be formed in the shape of a card. The authentication information of the key may be physically provided on a surface of the key by engraving, printing, or attaching, or may be magnetically or electrically provided on the surface or in the interior of the key by an RF tag.

[1.1.1-2. Driving Unit 21]

The driving unit 21 is configured to perform locking and unlocking of a lock body portion of the electric lock 2. In the present embodiment, as one example, the driving unit 21 may perform locking and unlocking in response to an authentication result indicating that the person who performs locking and unlocking is a legitimate person (which is also referred to as a legitimate authentication result) being supplied from the authentication unit 20. In addition, the driving unit 21 may alternately perform locking and unlocking, each time the legitimate authentication result is supplied. In other words, the driving unit 21 may not have an automatic locking function for performing automatic locking after unlocking. Note that the power source of the driving unit 21 may be a battery or may be an electric power source provided in the facility.

[1.1.1-3. Indicator 22]

The indicator 22 is provided on the surface of the electric lock 2, and may indicate a state of the electric lock 2 by emitting light. The indicator 22 may have at least one light emitting lamp, and may emit light of a color corresponding to a state of the electric lock 2.

The state of the electric lock 2 may be at least one of an unlocked state (which is also referred to as an unlock state), a locked state (which is also referred to as a lock state), or a transitional state between the unlocked state and the locked state. When light of the indicator 22 indicates such states, the change of the state of light may indicate that an operation is performed on the electric lock 2.

Note that, when the indicator 22 indicates that the electric lock 2 is in the unlocked state or the locked state, a sensor for sensing the state of the lock body portion (not shown) may be provided on the electric lock 2, and the sensor may supply the indicator 22 with a sensing signal. When the indicator 22 indicates that the electric lock 2 is in the transitional state, the driving unit 21 may supply the indicator 22 with a signal indicating that the driving unit 21 is driving.

[1.1.1-4. Communication Unit 23]

The communication unit 23 is configured to communicate with the apparatus 4 via the communication network 10. The communication unit 23 may send, to the apparatus 4, information about which state the electric lock 2 is in. The communication unit 23 may continuously send a current state of the electric lock 2, or may send a state after change to the apparatus 4 in response to the state of the electric lock 2 being changed.

[1.1.2. Apparatus 4]

The apparatus 4 is configured to support security of the facility by cooperating with the electric lock 2 provided on the outside of the apparatus 4. The apparatus 4 has a detection unit 41, a history storage unit 42, a setting unit 43, a control unit 45, a monitoring camera 46, an image storage unit 47, and a communication unit 40.

[1.1.2-1. Detection Unit 41]

The detection unit 41 is configured to detect a state of the electric lock 2. The detection unit 41 may detect the state of the electric lock 2 (in the present embodiment, as one example, any of the locked state, the unlocked state, and the transitional state) by communication between the electric lock 2 and the communication unit 40. The detection unit 41 may further detect change of the state of the electric lock 2 (as one example, change from the locked state to the unlocked state). The detection unit 41 may supply the history storage unit 42 and the control unit 45 with a signal indicating a detection result.

[1.1.2-2. History Storage Unit 42]

The history storage unit 42 is one example of a first storage unit, and is configured to store a lock history of the electric lock 2. The lock history may indicate a time of day when locking was performed in the past.

In the present embodiment, as one example, the history storage unit 42 may store a history of the detection result obtained by the detection unit 41 in association with the detection time of day. Thus, the history storage unit 42 stores the time of day when the electric lock 2 is turned to the locked state, i.e., the time of day when the electric lock 2 is locked.

[1.1.2-3. Setting Unit 43]

The setting unit 43 is configured to set a reference time of day based on the lock history stored in the history storage unit 42. The setting unit 43 may supply the control unit 45 with the set reference time of day.

The reference time of day may be a time of day when the electric lock 2 should be locked. The setting unit 43 may detect the latest locking time of day in each of a plurality of days (which is also referred to as the final locking time of day), and set the time of day having a representative value thereof (as one example, the mean value, mode value, or median value) as the reference time of day. Instead of this, the setting unit 43 may set the latest time of day or the earliest time of day among the final locking time of day in each of the plurality of days as the reference time of day. The setting unit 43 may reset the reference time of day every day, or may reset every fixed time period (as one example, every week or every month).

[1.1.2-4. Control Unit 45]

The control unit 45 is one example of a judging unit, and is configured to judge whether the electric lock 2 is locked at the reference time of day. The control unit 45 may perform judgement based on the detection result obtained by the detection unit 41, and may control the communication unit 40 according to the judging result. The control unit 45 may be capable of acquiring the current time of day, and may perform the judgement according to the fact that the current time of day is the reference time of day. The control unit 45 may perform clocking by itself, and may acquire the current time of day by wired or wireless communication from the outside. The control unit 45 may further control each unit of the apparatus 4.

[1.1.2-5. Monitoring Camera 46]

The monitoring camera 46 is arranged on the inside of the doorway to perform capturing. The capture region of the monitoring camera 46 may or may not include the doorway at which the electric lock 2 is provided. As one example, the capture region may be the inside of a room located on the inside of the doorway.

In the present embodiment, as one example, the monitoring camera 46 is configured to continuously perform capturing of a video image. However, the monitoring camera 46 may perform capturing of still images every reference interval (for example, 5 seconds). When the monitoring camera 46 captures video image data, the monitoring camera 46 may perform capturing at 30 f/s, as one example. The monitoring camera 46 may be a camera for visible light or may be a camera for infrared light or ultraviolet light (as one example, X-ray). The monitoring camera 46 may store captured image data in the image storage unit 47.

[1.1.2-6. Image Storage Unit 47]

The image storage unit 47 is configured to store image data acquired by the monitoring camera 46. The image storage unit 47 may store the image data captured by the monitoring camera 46 in association with the capture date. The image storage unit 47 may save the image data at least for a reference time period (as one example, 5 days), and may sequentially save new image data over old image data. The capacity of the image storage unit 47 may be 1 TB, as one example.

[1.1.2-7. Communication Unit 40]

The communication unit 40 is configured to communicate with the electric lock 2. The communication unit 40 may receive the state of the electric lock 2 from the communication unit 23 of the electric lock 2, and supply the detection unit 41 with the state of the electric lock 2.

The communication unit 40 may be one example of a sending unit, and, when the electric lock 2 is not locked at the reference time of day, the communication unit 40 may send image data captured by the monitoring camera 46 or location information of the image data to a destination corresponding to the electric lock 2. As one example, the communication unit 40 may send the image data captured by the monitoring camera 46 after the reference time of day or the location information of the image data to the destination.

The destination may be, for example, a server connected with the electric lock 2 to constitute another security system with the electric lock 2, or may be a security company that has installed the electric lock 2, or may be an owner or a management company of the facility, or may be a local police, a fire station, or an emergency hospital including the facility. The location information of the image data may be an address of the image data in the image storage unit 47 or the file server 5, or may be the capture time of day of the image data.

The communication unit 40 may further send the image data captured by the monitoring camera 46 to the file server 5 that is accessible from another device. The communication unit 40 may periodically send captured and accumulated image data to the file server 5, according to control from the control unit 45.

[1.1.3. File Server 5]

The file server 5 is accessible from another device that is different from the apparatus 4 (as one example, a server connected with the electric lock 2, or a security company that has installed the electric lock 2), and shares a stored file with the another device. The file server 5 may be accessible simultaneously from a plurality of devices.

[1.1.4. Effect Resulting from Security System 1]

According to the above described apparatus 4 in the security system 1, when the electric lock 2 is not locked at the reference time of day, image data captured by the monitoring camera 46 or location information of the image data is sent to a destination corresponding to the electric lock 2. Therefore, when the doorway is not locked at the reference time of day, the state on the inside of the doorway can be checked by an image and an abnormality on the inside of the doorway can be sensed at an early stage.

In addition, because the reference time of day is set based on the lock history of the electric lock 2, setting of an early time of day, when normally the electric lock 2 is not locked, as the reference time of day can be prevented. Therefore, sending of an image at safe time of day, when no checking is needed, can be prevented. In addition, setting of a late time of day, when normally the electric lock 2 is locked already (far before), as the reference time of day can be prevented. Therefore, late sensing of an abnormality due to late sending of an image can be prevented.

In addition, because the state of the electric lock 2 is detected by communication between the apparatus 4 and the electric lock 2, the state of the electric lock 2 can be detected accurately.

In addition, because the image data captured by the monitoring camera 46 is sent to the file server 5, accessibility to the image data can be improved while preventing concentration of access to the apparatus 4.

1.2. Operation of Apparatus 4

Figure 2:
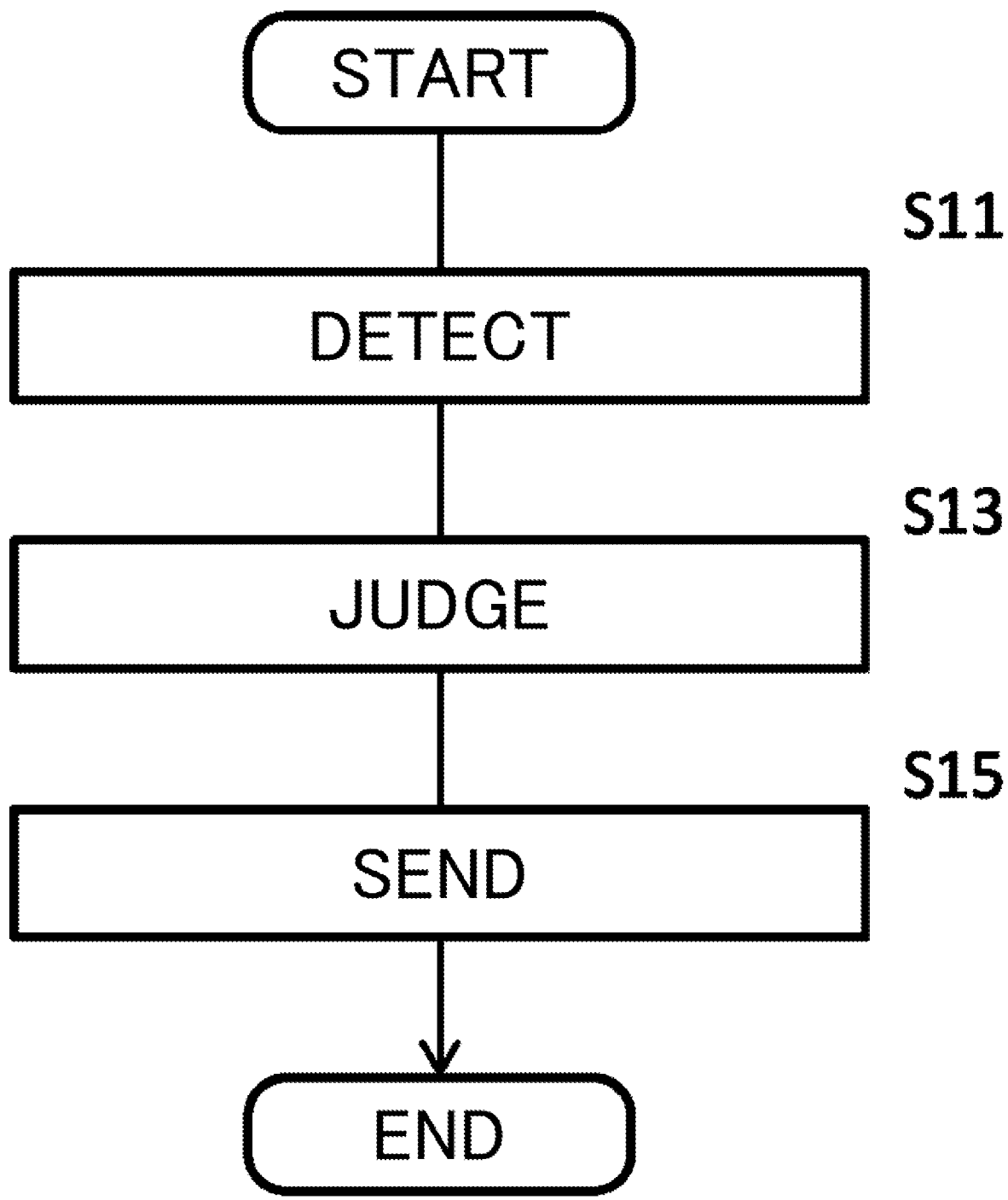
FIG. 2 shows an operation of an apparatus 4.

FIG. 2 shows an operation of the apparatus 4. The apparatus 4 is configured to support the security of the facility by performing processings of Steps S11 to S15. Note that, at the time of starting of the operation, the reference time of day may be set by the setting unit 43 in advance.

At Step S11, the detection unit 41 detects a state of the electric lock 2. The detection unit 41 may detect the state of the electric lock 2 (in the present embodiment, as one example, any of the locked state and the unlocked state) by communication between the electric lock 2 and the communication unit 40. The detection unit 41 may detect the state of the electric lock 2 before the reference time of day, or may detect at the reference time of day.

At Step S13, the control unit 45 judges, at the reference time of day, whether the electric lock 2 is locked based on a detection result obtained by the detection unit 41. Then, when the electric lock 2 is not locked at the reference time of day, at Step S15, the control unit 45 may cause sending of image data captured by the monitoring camera 46 or location information of the image data to a destination corresponding to the electric lock 2 from the communication unit 40. Note that, when the electric lock 2 is locked at the reference time of day, the control unit 45 may not cause the sending.

1.3. Variations of First Embodiment

Note that, in the above described first embodiment, a case is described above where the electric lock 2 has no automatic locking function for performing automatic locking after unlocking, but the electric lock 2 may have an automatic locking function.

For example, when having performed unlocking, the driving unit 21 of the electric lock 2 may perform locking after a fixed time period has lapsed. Instead of this, after having performed unlocking, the driving unit 21 may perform locking in response to closing of a door on the doorway at which the electric lock 2A is provided.

In this case, the history storage unit 42 may further store a history of entry and exit via the doorway. The history of entry and exit may indicate the time of day when entry to the inside of the doorway and exit to the outside are performed. In the present embodiment, as one example, when unlocking of the electric lock 2A is performed on the outside of the doorway, the unlocking time of day is used as an entry time of day and stored in the history storage unit 42A. In addition, when unlocking is performed on the inside of the doorway, the unlocking time of day is used as an exit time of day and stored in the history storage unit 42A. Note that, the method for distinguishing between entry and exit is not limited thereto. For example, the apparatus 4 is provided with a monitoring camera configured to capture a face of an exiting person, a monitoring camera configured to capture a face of an entering person, and a distinguishing unit (not shown) configured to distinguish whether entry or exit is performed based on images captured by these monitoring cameras, and exit and entry may be distinguished by distinguishing by the distinguishing unit.

In addition, the control unit 45 may judge, at the reference time of day, whether the electric lock 2 is locked by automatic locking in response to unlocking by the last exiting person. In other words, the control unit 45 may judge whether the last exiting person exited by the reference time of day.

For example, the control unit 45 may count the number of persons remaining on the inside of the doorway, based on the entry and exit history in the history storage unit 42. When the last single person remaining on the inside of the doorway exits, the control unit 45 may judge the person as the last exiting person. The control unit 45 may judge, at the reference time of day, whether the electric lock 2 is automatically locked after the last exiting person exited by unlocking the electric lock 2.

In this case, when the electric lock 2 is not locked by automatic locking in response to unlocking by the last exiting person at the reference time of day, image data captured by the monitoring camera 46 or location information of the image data is sent. Therefore, even in a case where the electric lock 2 is configured to be automatically locked after unlocking, when the owner of the key remains on the inside of the doorway and the electric lock 2 is not locked at the reference time of day, the state on the inside of the doorway can be checked by an image and an abnormality on the inside of the doorway can be sensed at an early stage.

1.4. Other Variations

In addition, a case is described above where the apparatus 4 has the history storage unit 42 and the setting unit 43, but the apparatus 4 may have no history storage unit 42 and/or setting unit 43. In this case, the control unit 45 may judge, at a preset reference time of day, whether the electric lock 2 is locked.

2. Second Embodiment

2.1. System 1A

Figure 3:
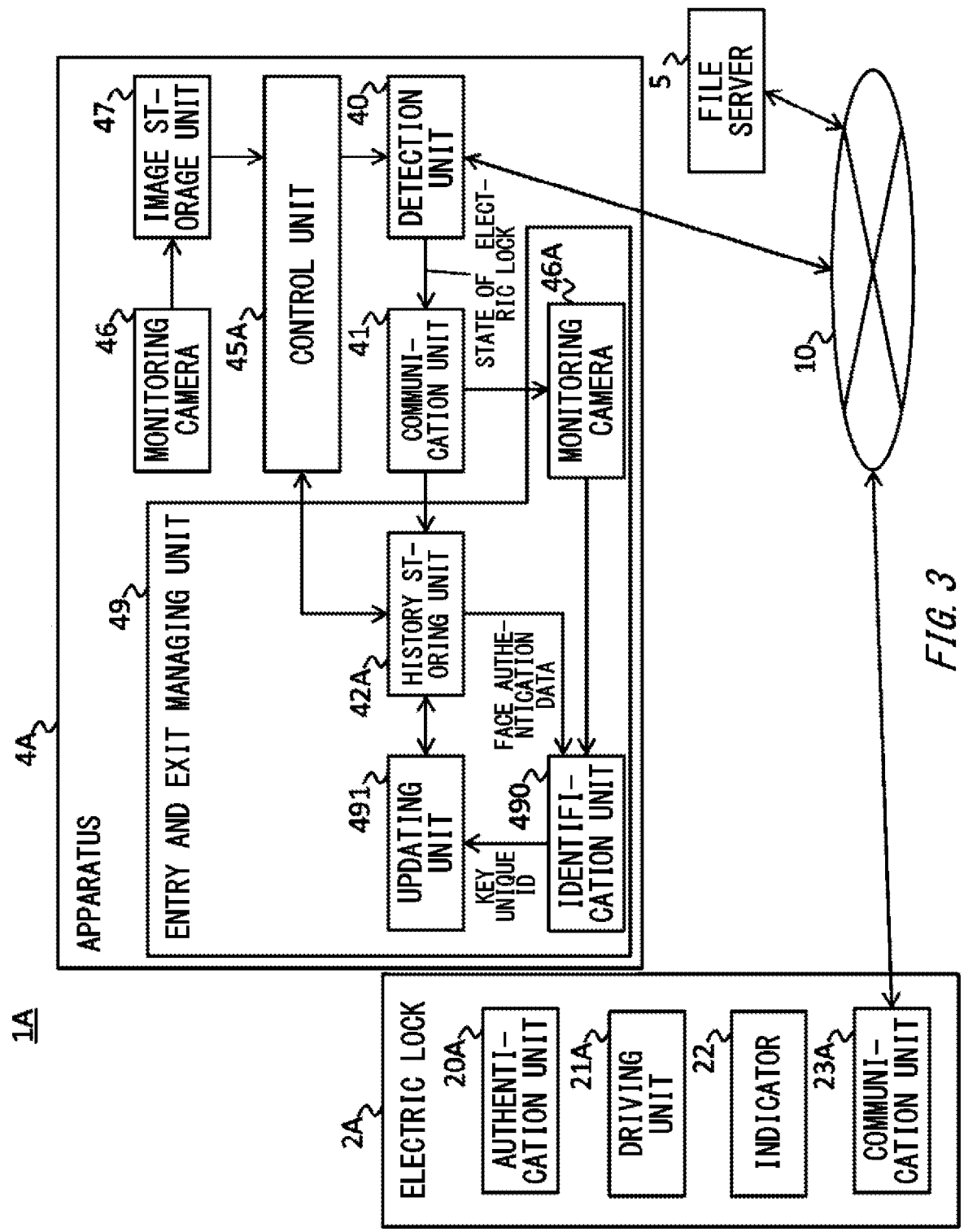
FIG. 3 shows a security system 1A according to a second embodiment.

FIG. 3 shows a security system 1A according to a second embodiment. The security system 1A includes an electric lock 2A and an apparatus 4A. Note that, in the system 1A according to the present embodiment, those ones substantially identical to the operation of the system 1 shown in FIG. 1 are labeled with the identical reference numerals, and their descriptions are abbreviated.

2.1. Electric Lock 2A

The electric lock 2A has an authentication unit 20A, a driving unit 21A, and a communication unit 23A.

[2.1.1. Authentication Unit 20A]

The authentication unit 20A is configured to perform authentication by using authentication information provided on a key used by a person who performs locking and unlocking. The authentication unit 20A may be capable of reading a unique ID of each key that is used. The authentication unit 20A may perform, in addition to authentication using authentication information of the key, authentication using biological information of a person who performs locking and unlocking or authentication using a password inputted via an input device. The authentication unit 20A may supply the driving unit 21A with the authentication result. In addition, the authentication unit 20A may supply the communication unit 23A with the read unique ID, when a legitimate authentication result is obtained.

[2.1.1. Driving Unit 21A]

The driving unit 21A has an automatic locking function for performing automatic locking after unlocking.

[2.1.1. Communication Unit 23A]

The communication unit 23A may send, to the apparatus 4A, information about which state the electric lock 2A is in. In the present embodiment, the electric lock 2A is basically in the locked state because of the automatic locking function. Therefore, when the state of the electric lock 2A is changed to the transitional state or the unlocked state, the communication unit 23A may send, to the apparatus 4A, information indicating to that effect. When the electric lock 2A is changed to the transitional state or the unlocked state, the communication unit 23 may further send, to the apparatus 4A, an unique ID of the key read by the authentication unit 20A from the key that is used.

2.2. Apparatus 4A

The apparatus 4A has an entry and exit managing unit 49 and a control unit 45A.

[2.2.1. Entry and Exit Managing Unit 49]

The entry and exit managing unit 49 is configured to manage entry to the inside of the doorway and exit to the outside. The entry and exit managing unit 49 has a history storage unit 42A, a monitoring camera 46A, an identification unit 490, and an updating unit 491.

[2.2.1.1. History Storage Unit 42A]

The history storage unit 42A is one example of a third storage unit, and is configured to store a history of entry and exit by the owner of each key, a unique reference time of day, and face authentication data of the owner of the key, in association with the unique ID of each key used for the electric lock 2A.

For example, the history storage unit 42A may store the history of entry and exit, in a similar manner to that of the history storage unit 42 in the variations of the first embodiment above described.

The unique reference time of day may be a reference time of day for each key. In the present embodiment, as one example, each reference time of day may be set by the owner or the management company of the facility. Note that, the setting unit 43 in the first embodiment may be provided in the apparatus 4A, and the reference time of day may be sequentially set by the setting unit 43 based on history information for each key.

The face authentication data is data for authenticating a user of the key, and may be data indicating a face of the legitimate owner of the key. The face authentication data may be image data of the face, or may be data indicating a characteristic of the face. The characteristic of the face may be a positional relationship between characteristic points of the face, or may be the color of eyes, skin, or hair, or may be the color, the shape, or the like of an accessory (as one example, glasses, pierced earrings, or the like). When the authentication unit 20A of the electric lock 2A performs face authentication, the face authentication data may be identical data as the data used for the authentication.

[2.2.1.1. Monitoring Camera 46A]

The monitoring camera 46A is one example of a second monitoring camera, and is configured to capture a face of a person exiting to the outside from the doorway at which the electric lock 2A is provided. The capture region of the monitoring camera 46A may or may not include the doorway at which the electric lock 2A is provided.

The monitoring camera 46A may perform capturing in response to the detection unit 41 detecting that the electric lock 2A is not in the locked state. Instead of this, the monitoring camera 46A may perform capturing in response to sensing of a person at the doorway, at which the electric lock 2A is provided, by a human sensor that is not shown. When the monitoring camera 46A captures video image data, the monitoring camera 46A may perform capturing at 30 f/s, as one example. The monitoring camera 46A may be a camera for visible light or may be a camera for infrared light or ultraviolet light (as one example, X-ray). The monitoring camera 46A may be identical to, or may be different from, the monitoring camera 46. The monitoring camera 46A may supply the identification unit 490 with the captured image data.

[2.2.1.1. Identification Unit 490]

The identification unit 490 is configured to collate a face in the image data captured by the monitoring camera 46A with each face authentication data stored in the history storage unit 42A, and identify a unique ID corresponding to the face in the image data. Thus, even in a case where a plurality of key owners exit while the electric lock 2A is unlocked by one key, the unique ID of the key owned by each of the exiting persons is identified. The identification unit 490 may supply the updating unit 491 with the identified unique ID of the key.

[2.2.1.1. Updating Unit 491]

The updating unit 491 is configured to update, in response to the unique ID of the key being identified by the identification unit 490, entry and exit history of the history storage unit 42A by recording that the key of the unique ID is used for locking. Thus, even in a case where a plurality of key owners exit while the electric lock 2A is unlocked by one key, the entry and exit history is updated by recording that the key owned by each of the exiting persons is used for locking. The updating unit 491 may set the capture time of day by the monitoring camera 46A as the locking or unlocking time of day.

[2.2.1. Control Unit 45A]

The control unit 45A is one example of a judging unit, and is configured to refer to the reference time of day and the history of entry and exit applicable for each key, and judge whether the electric lock 2A is locked by the reference time of day by automatic locking in response to unlocking using the key. The control unit 45A may detect the unique ID of each key, the reference time of day of which is the current time of day, in the history storage unit 42, and judge whether the entry and exit history associated with the unique ID indicates exit of each of the owners of the keys.

The control unit 45A may be capable of acquiring the current time of day, and may perform judgement in response to the current time of day being the reference time of day. The control unit 45A may perform clocking by itself, and may acquire the current time of day by wired or wireless communication from the outside.

The control unit 45A may control the communication unit 40 based on the judging result. For example, when at least one owner of the key has not exited by the unique reference time of day of the key, the control unit 45A may cause sending of image data captured by the monitoring camera 46A or location information of the image data to the destination corresponding to the electric lock 2A from the communication unit 40. The control unit 45A may further control each unit of the apparatus 4A.

The above described apparatus 4A stores the unique reference time of day and the history of entry and exit by the owner of each key in association with the unique ID of each key, and refers to the reference time of day and the history of entry and exit applicable for each key, and judges whether the electric lock 2A is locked by the reference time of day by automatic locking in response to unlocking using the key. Therefore, when the key owner remains on the inside of the doorway and the electric lock 2A is not locked at the reference time of day applicable for each key, the state on the inside of the doorway can be checked by the an image.

In addition, face authentication data of the owner of the keys is further stored in association with the unique ID of each key, and a face in the image data capturing a person exiting to the outside from the doorway is collated with each face authentication data. Then, in response to the unique ID corresponding to the face in the image data being identified, the entry and exit history is updated by recording that the key of the unique ID is used for locking. Therefore, even in a case where the owner of another key exits to the outside from the doorway while one key is used to perform locking and unlocking, the entry and exit can be detected accurately.

2.3. Variations of Second Embodiment

Note that, in the above described second embodiment, a case is described above where the identification unit 490 identifies the unique ID of the own key of an exiting person, but, in addition to this, the identification unit 490 may identify the unique ID of the own key of an entering person. In this case, the apparatus 4A may be provided with a monitoring camera configured to capture a face of an entering person, in addition to the monitoring camera 46A configured to capture a face of an exiting person. Thus, entry and exit can be detected more accurately.

In addition, a case is described above where the history storage unit 42A stores the face authentication data, but the history storage unit 42A may not store the face authentication data. In this case, the entry and exit managing unit 49 may not have the identification unit 490 and the updating unit 491, and the control unit 45A may judge whether the key is used to lock the electric lock 2A by the reference time of day for each key.

3. Variations

Note that, in the above described first embodiment and second embodiment as well as these variations, a case is described above where each of the apparatuses 4, 4A has the communication unit 40, but each of the apparatus 4, 4A may have no communication unit 40. In this case, the detection unit 41 may detect the state of the electric lock 2 according to change of the light emitting state of the indicator 22 provided on the electric lock 2. Thus, the operation of the electric lock 2 is detected. The detection unit 41 may detect that preset light is emitted. The light to be detected may be light emitted when the electric lock 2 is in the abnormal state, or may be light emitted when the electric lock 2 operates normally (as one example, light indicating that the electric lock 2 is in at least one of the unlocked state, the locked state or the transitional state therebetween). When the electric lock 2 emits an operational sound of locking and unlocking or a sound according to an authentication result by the authentication unit 20, the detection unit 41 may detect the state of the electric lock 2 by the sound. The sound to be detected may be a sound emitted when the electric lock 2 operates normally, or may be a sound emitted when the electric lock 2 is in the abnormal state.

In addition, a case is described above where the indicator 22 of the electric lock 2 indicates a state of the electric lock 2 (as one example, the locked state, the unlocked state, or the transitional state), but the indicator 22 may indicate an authentication result obtained by the authentication unit 20. In this case, the detection unit 41 may detect that the light indicating the legitimate authentication result is emitted. However, when the electric lock 2 and the apparatus 4 are communicatively connected with each other, the electric lock 2 may not have the indicator 22.

In addition, various embodiments of the present invention may be described with reference to flowcharts and block diagrams whose blocks may represent (1) steps of processes in which operations are performed or (2) sections of apparatuses responsible for performing operations. Certain steps and sections may be implemented by at least any one of a dedicated circuitry, a programmable circuitry supplied with computer-readable instructions stored on a computer-readable medium, and/or processors supplied with computer-readable instructions stored on a computer-readable medium. The dedicated circuitry may include digital and/or analog hardware circuits and may include integrated circuits (IC) and/or discrete circuits. The programmable circuitry may include reconfigurable hardware circuits including logical AND, OR, XOR, NAND, NOR, and other logical operations, flip-flops, registers, memory elements such as field-programmable gate arrays (FPGA) and programmable logic arrays (PLA), and the like.

The computer-readable medium may include any tangible device that can store instructions for execution by a suitable device, such that the computer-readable medium having instructions stored therein is provided with an article of manufacture including instructions which may be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, and the like.

Figure 4:
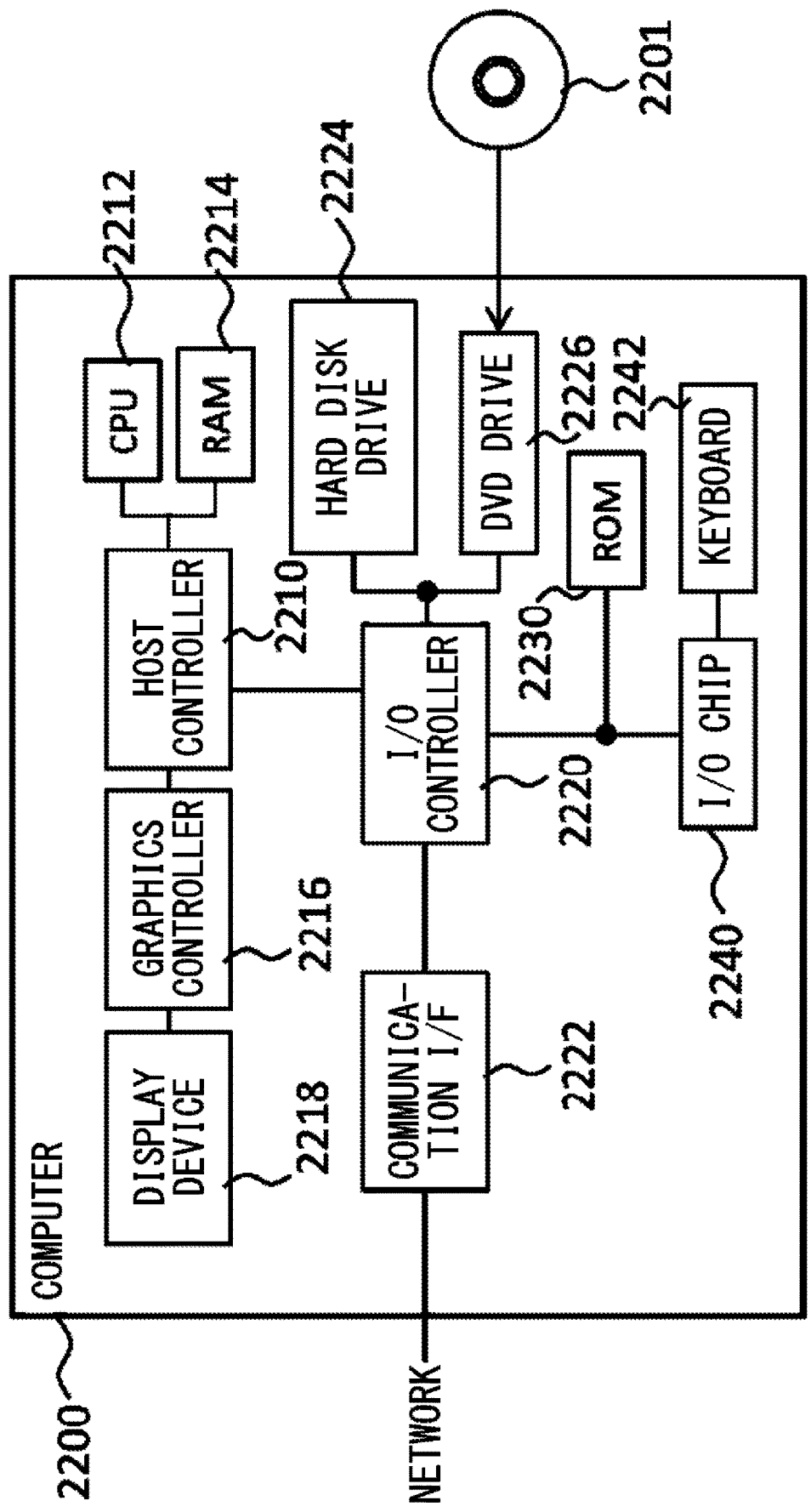
FIG. 4 shows an example of a computer 2200 in which a plurality of aspects of the present invention may be entirely or partially embodied.

FIG. 4 illustrates an example of a computer 2200 in which a plurality of aspects of the present invention may be entirely or partially embodied. A program that is installed in the computer 2200 can cause the computer 2200 to function as or perform operations associated with apparatuses according to the embodiments of the present invention or one or more sections thereof, and/or cause the computer 2200 to perform processes of the embodiments of the present invention or steps thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may connect various input/output units via a parallel port, a serial port, a keyboard port, a mouse port, and the like to the input/output controller 2220.

A program is provided by a computer-readable medium such as the DVD-ROM 2201 or the IC card. The program is read from the computer-readable medium, installed into the hard disk drive 2224, RAM 2214, or ROM 2230, which are also examples of a computer-readable medium, and executed by the CPU 2212. The information processing described in these programs is read into the computer 2200, resulting in cooperation between a program and the above described various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like, and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may perform various types of processing on data read from the RAM 2214 including various types of operations, information processing, conditional determination, conditional branching, unconditional branching, information search/replacement, etc., which are described throughout the present disclosure and designated by an instruction sequence of the program, and the results may be written back to the RAM 2214. In addition, the CPU 2212 may search for information in a file, a database, or the like, in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable medium on the computer 2200 or near the computer 2200. In addition, a recording medium such as a hard disk or a RAM provided in a server system connected to a dedicated communication network or the Internet can be used as the computer-readable medium, thereby providing the program to the computer 2200 via the network.

While the embodiments of the present invention have been described above, the technical scope of the invention is not limited to the above described embodiments. It is apparent to persons skilled in the art that various alterations or improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams for convenience, it does not necessarily mean that the process must be performed in this order.

EXPLANATION OF REFERENCES

1: security system
2: electric lock
4: apparatus
5: file server
10: communication network
20: authentication unit
21: driving unit
22: indicator
23: communication unit
40: communication unit
41: detection unit
42: history storage unit
43: setting unit
45: control unit
46: monitoring camera
47: image storage unit
49: entry and exit managing unit
490: identification unit
491: updating unit
2200: computer
2201: DVD-ROM
2210: host controller
2212: CPU
2214: RAM
2216: graphics controller
2218: display device
2220: input/output controller
2222: communication interface
2224: hard disk drive
2226: DVD-ROM drive
2230: ROM
2240: input/output chip
2242: keyboards

What is claimed is:
1. An apparatus comprising:
 a detection unit configured to detect a state of an electric lock provided at a doorway;
 a first monitoring camera arranged on the inside of the doorway;
 a judging unit configured to judge, at a reference time of day, whether the electric lock is locked;
 a sending unit configured to send image data captured by the first monitoring camera or location information of the image data to a destination corresponding to the electric lock, when the electric lock is not locked at the reference time of day;

a first storage unit configured to store a lock history of the electric lock; and a setting unit configured to modify the reference time of day based on the lock history.

2. The apparatus according to claim 1, wherein the electric lock is configured to perform automatic locking after unlocking, wherein the apparatus comprises a second storage unit configured to store a history of entry and exit via the doorway, and wherein the judging unit is configured to judge, at the reference time of day, whether the electric lock is locked by automatic locking in response to unlocking by a last exiting person.

3. The apparatus according to claim 2, comprising a communication unit configured to communicate with the electric lock, wherein the detection unit is configured to detect a state of the electric lock by communication between the electric lock and the communication unit.

4. The apparatus according to claim 2, wherein the sending unit is configured to send image data captured by the first monitoring camera after the reference time of day or location information of the image data to the destination.

5. The apparatus according to claim 2, wherein the sending unit is configured to further send the image data captured by the first monitoring camera to a file server that is accessible from another device.

6. The apparatus according to claim 1, wherein the electric lock is configured to perform automatic locking after unlocking and reading a unique ID of each key that is used, wherein the apparatus comprises a third storage unit configured to store a unique reference time of day and a history of entry and exit by an owner of each key, in association with the unique ID of each key, and wherein the judging unit is configured to refer to the reference time of day and the history of entry and exit applicable for each key, and judge whether the electric lock is locked by the reference time of day by automatic locking in response to unlocking using the key.

7. The apparatus according to claim 6, wherein the third storage unit is configured to further store face authentication data of an owner of each key, in association with the unique ID of the key, wherein the apparatus further comprises:

a second monitoring camera configured to capture a face of a person exiting to the outside through the doorway;

an identification unit configured to collate a face in image data captured by the second monitoring camera with each face authentication data stored in the storage unit, and identify the unique ID corresponding to the face in the image data; and an updating unit configured to update, in response to the unique ID being identified by the identification unit, the history of entry and exit by recording that the key of the unique ID is used for locking.

8. The apparatus according to claim 1, comprising a communication unit configured to communicate with the electric lock, wherein the detection unit is configured to detect a state of the electric lock by communication between the electric lock and the communication unit.

9. The apparatus according to claim 1, wherein the detection unit is configured to detect a state of the electric lock by a change of a light emitting state of an indicator provided on the electric lock.

10. The apparatus according to claim 1, wherein the sending unit is configured to send image data captured by the first monitoring camera after the reference time of day or location information of the image data to the destination.

11. The apparatus according to claim 1, wherein the sending unit is configured to further send the image data captured by the first monitoring camera to a file server that is accessible from another device.

12. A method comprising:

detecting a state of an electric lock provided at a doorway;

judging, at a reference time of day, whether the electric lock is locked;

sending image data captured by a first monitoring camera arranged on the inside of the doorway or location information of the image data to a destination corresponding to the electric lock, when the electric lock is not locked at the reference time of day;

storing a lock history of the electric lock; and modifying the reference time of day based on the lock history.

13. A non-transitory computer-readable medium having recorded thereon a program that when executed by a computer, causes the computer to function as:

a detection unit configured to detect a state of an electric lock provided at a doorway;

a first monitoring camera arranged on the inside of the doorway;

a judging unit configured to judge, at a reference time of day, whether the electric lock is locked;

a sending unit configured to send image data captured by the first monitoring camera or location information of the image data to a destination corresponding to the electric lock, when the electric lock is not locked at the reference time of day;

a first storage unit configured to store a lock history of the electric lock; and a setting unit configured to modify the reference time of day based on the lock history.

* * * * *